United States Patent [19]
Sekiguchi

[11] Patent Number: 5,755,494
[45] Date of Patent: May 26, 1998

[54] BRAKE CONTROL MODULE

[75] Inventor: Akihiko Sekiguchi, Saitama, Japan

[73] Assignee: Akebono Brake Industry Co., Ltd., Tokyo, Japan

[21] Appl. No.: 702,092

[22] Filed: Aug. 23, 1996

[30] Foreign Application Priority Data

Aug. 23, 1995 [JP] Japan ................................. 7-214872

[51] Int. Cl.$^6$ ........................................................ B60T 8/36
[52] U.S. Cl. .................................... 303/119.2; 303/113.1
[58] Field of Search ................................. 303/119.2, 113.1, 303/113.2, 119.1; 137/884, 596.17; 335/202; 336/192; 439/76, 672; 251/129.01, 129.15

[56] References Cited

U.S. PATENT DOCUMENTS

5,374,114  12/1994  Burgdorf et al. ................... 303/113.1
5,577,322  11/1996  Ohshita et al. ...................... 303/119.2

Primary Examiner—Douglas C. Butler
Attorney, Agent, or Firm—Morgan, Lewis & Bockius LLP

[57] ABSTRACT

Each of the electromagnetic valves for opening and closing an oil path in the oil path block is formed of two separate components, an exciting portion including an exciting coil portion and an outer yoke, and an electromagnetic valve mechanism to be fit to the exciting portion. The electromagnetic valve mechanism are assembled into the oil path block, thereby providing a mechanism assembly. The exciting portions are mounted on the printed circuit board carrying thereon a control circuit for controlling the exciting portions, thereby providing an electric part assembly. By coupling the electric part assembly with the mechanism assembly, the electromagnetic valve mechanisms of the mechanism assembly are respectively fit to the exciting portions of the electric part assembly, to thereby complete the electromagnetic valves.

2 Claims, 7 Drawing Sheets (a)

BRAKE CONTROL MODULE

BACKGROUND OF THE INVENTION

1. Field of the Invention

This invention relates to a brake control module used for an antilock braking system and a traction control system.

2. Discussion of the Prior Art

Figure 8:
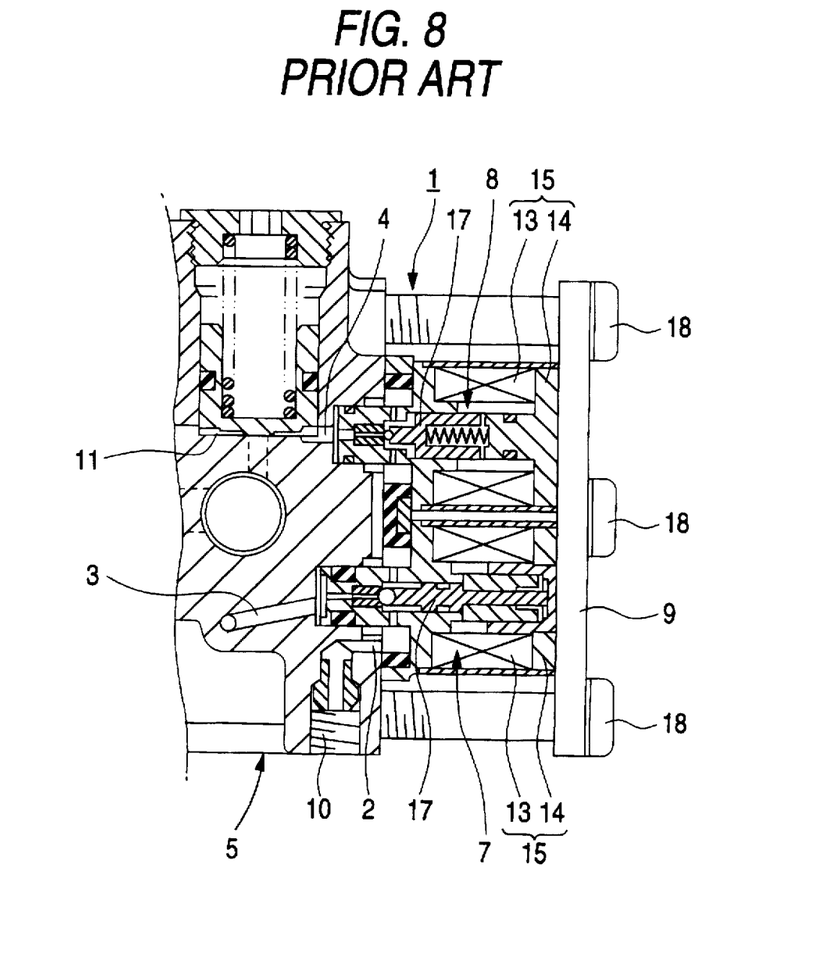
FIG. 8 is a cross sectional view showing a conventional brake control module.

FIG. 8 shows a conventional brake control module 1 used for an antilock braking system and a traction control system.

The brake control module 1, disclosed in Japanese Utility Model Publication No. Hei. 6-53346 comprises an assembly made up of an oil path block 5 which provides operating oil paths 2, 3 and 4 which communicatively connect a master cylinder for braking and braking cylinders for the wheels, a plural number of electromagnetic valves 7 and 8 for controlling oil pressure acting on the brake cylinders by opening and closing the operating oil paths 3 and 4 of the oil path block 5, and a control substrate 9 carrying thereon a control circuit (not shown) for controlling the operations of the electromagnetic valves 7 and 8.

The operating oil path 2 of the oil path block 5 is connected to a path connection port 10, which is connected to the wheel brake cylinders. A pipe connection port (not shown) connecting to the master cylinder is provided at the end of the operating oil path 3.

The operating oil path 4 is provided for bypassing the operating oil path 3. A sump chamber (low pressure accumulator) 11, for example, for temporarily storing the operating oil to be returned from the brake cylinder to the master cylinder is provided in the oil path block 5.

Each of the electromagnetic valves 7 and 8 is formed of a magnetic exciting portion 15 including an exciting coil portion 13 and an outer yoke 14 covering the exciting coil portion 13, and an electromagnetic valve mechanism 17 fit to the magnetic exciting portion 15. The magnetic exciting portion 15 and the electromagnetic valve mechanism 17 are assembled, and the assembled one is mounted on and fixed to the oil path block 5 in a state that it is pressed against the oil path block 5 by the control substrate 9, which is to be fixed to the oil path block 5 by means of screw members 18.

In the work of assembling the electromagnetic valves 7 and 8 into the oil path block 5 and pressing them against the oil path block by the control substrate 9, the harness connection work is performed for electrically connecting the exciting coil portion 13 to the control circuit on the control substrate 9.

In the brake control module 1 thus constructed, it is necessary to assemble the plural number of electromagnetic valves 7 and 8 into the oil path block 5 one by one. In assembling those valves 7 and 8, the harness connection to the control substrate 9 must be carried out for each of the electromagnetic valves 7 and 8. Therefore, the number of assembling steps is increased, and the assembling work is troublesome.

The wire harness for connecting the exciting coil portions 13 of the electromagnetic valves 7 and 8 to the control circuit brings about the increase of the number of required component parts and the number of assembling steps, and hence the increase of cost to manufacture.

SUMMARY OF THE INVENTION

Accordingly, an object of the present invention is to solve the problems described above, and to provide a brake control module that realizes a reduction of the number of manufacturing steps and the number of required component parts, a reduction in manufacturing cost, and an increase in manufacturing efficiency and ease.

According to the present invention, there is provided a brake control module comprising: a mechanism assembly having an electromagnetic valve mechanism; and an electric part assembly having an exciting coil portion and coupled to the mechanism assembly; wherein the electromagnetic valve mechanism fits to the exciting coil portion to complete an electromagnetic valve which control an oil pressure acting on a brake cylinder.

In the brake control module of the present invention, the exciting portions of the electromagnetic valves which must be electrically connected are separated from the electromagnetic valve mechanisms which are pure mechanical portions. These exciting portions of the electromagnetic valves are directly connected to the circuit board on which the control circuit for controlling the operations of the exciting portions is mounted. The brake portions. These exciting portions of the electromagnetic valves control module is thus constructed as an electric part assembly. Accordingly, the exciting portions of the electromagnetic valves are directly and electrically connected, and mechanically fixed to the control circuit by inserting the related portions thereof into the through-holes of the printed circuit board and soldering them, without using the wire harness as a separate connection part.

By merely coupling the mechanism assembly having the electromagnetic valve mechanism assembled thereinto with the electric part assembly, the electromagnetic valve mechanisms of the mechanism assembly are respectively fit to the corresponding exciting portions of the electric part assembly. The assembling of the plural number of electromagnetic valves is completed at a stroke. Thus, the number of assembling steps and the required component parts of the present invention are reduced when compared to the conventional brake control module where the electromagnetic valves are assembled one by one and the wire harness is used for the electrical connection.

Further, the steps attendant with oil soiling, for forming the mechanism assembly having the electromagnetic valve mechanism assembled thereinto with the electric part assembly, and the steps attendant with rejecting oil soils and dust, for forming the electric part assembly, may separately be performed. Therefore, the assembling and the handling of the mechanism are very easy.

DETAILED DESCRIPTION OF THE PREFERRED EMBODIMENT

Figure 1:
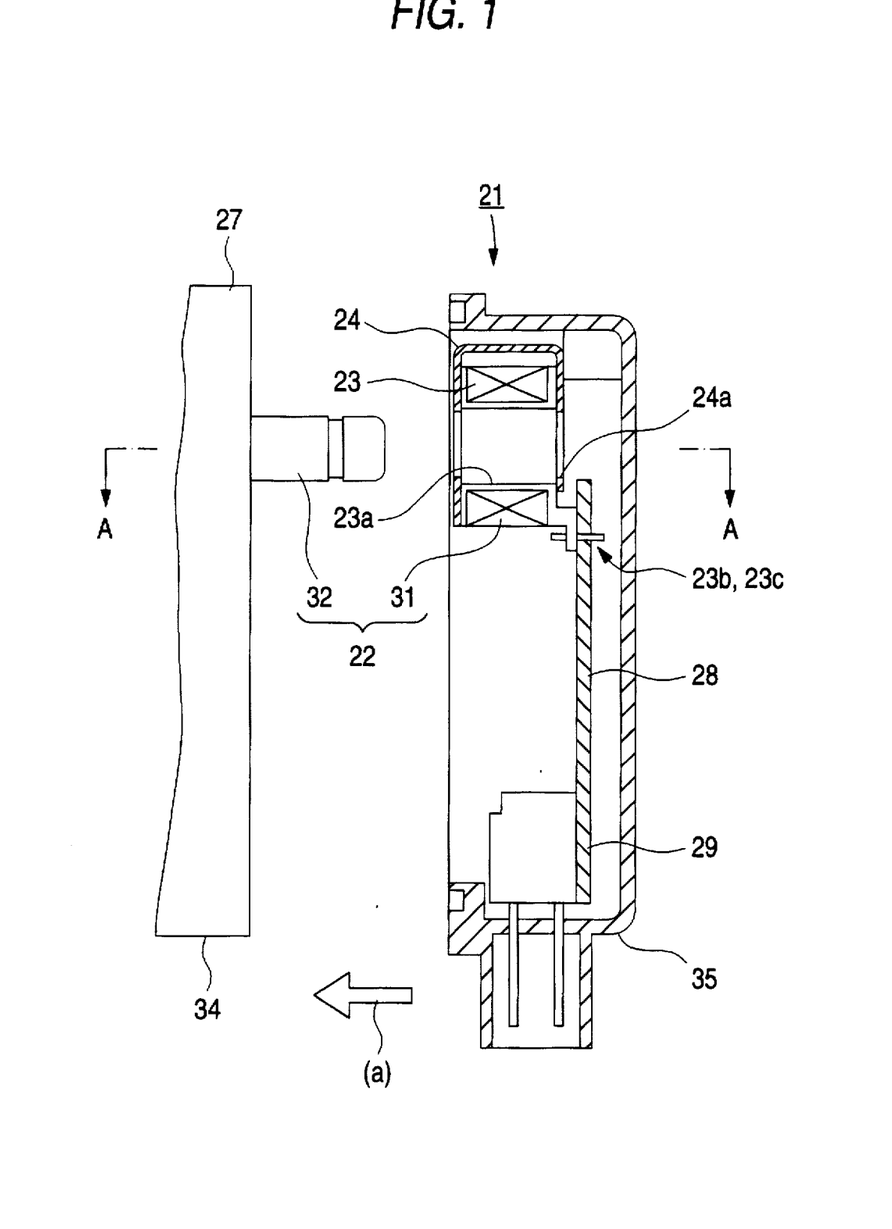
FIG. 1 is a cross sectional view showing a brake control module before assembly
Figure 2:
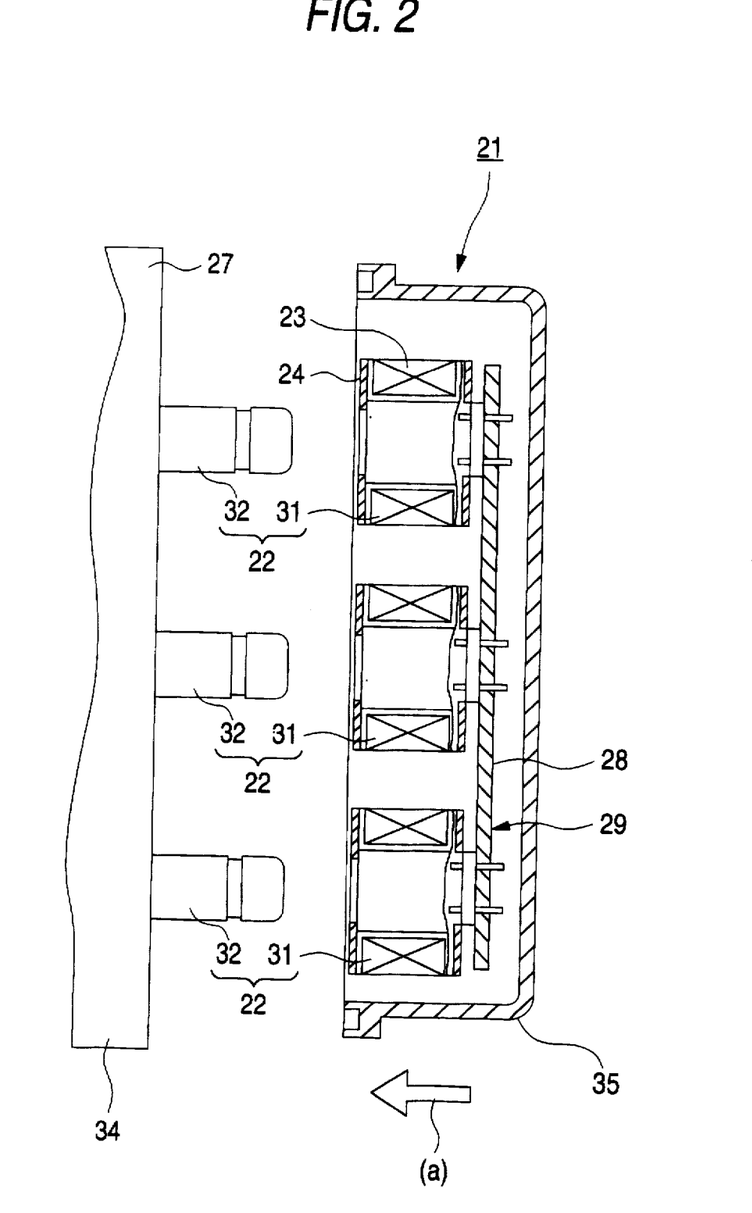
FIG. 2 is a cross sectional view taken along line A—A in FIG. 1.
Figure 3:
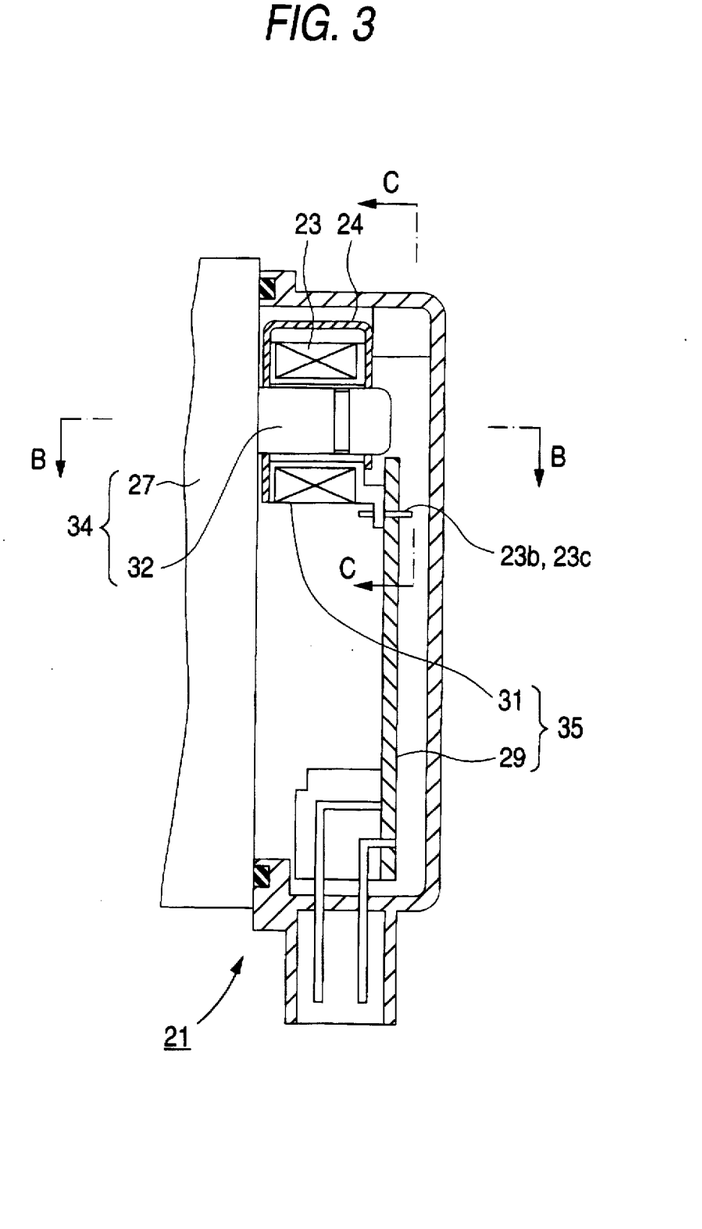
FIG. 3 is a cross sectional view showing the brake control module when the related component parts have been assembled thereinto.
Figure 4:
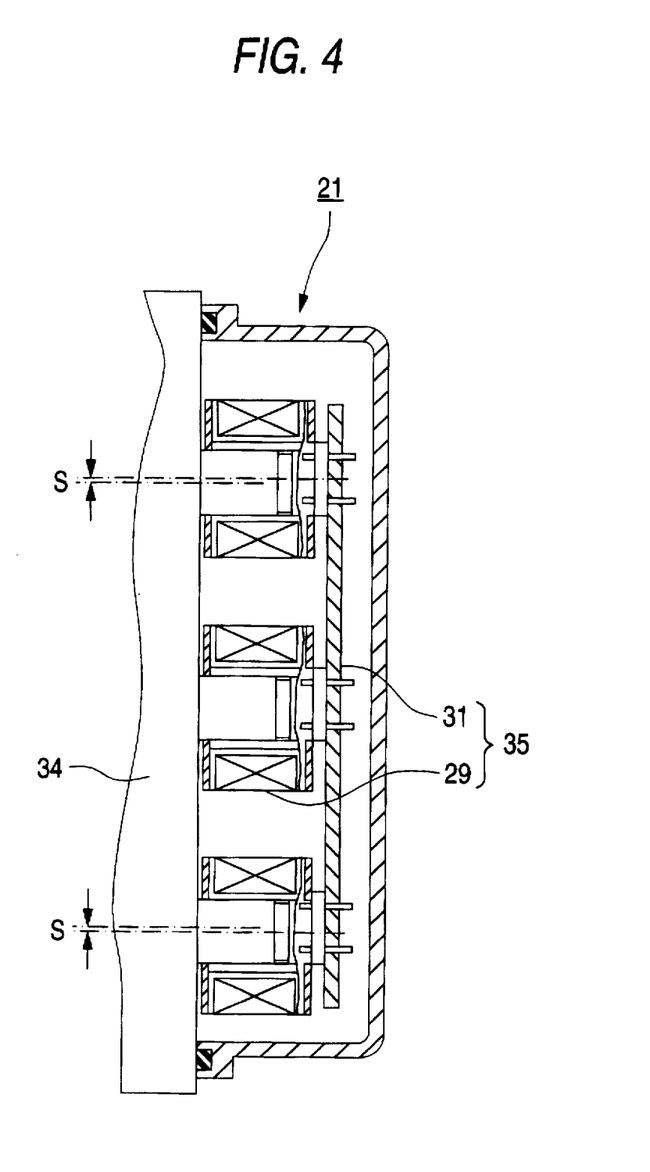
FIG. 4 is a cross sectional view taken along line B—B in FIG. 3.
Figure 5:
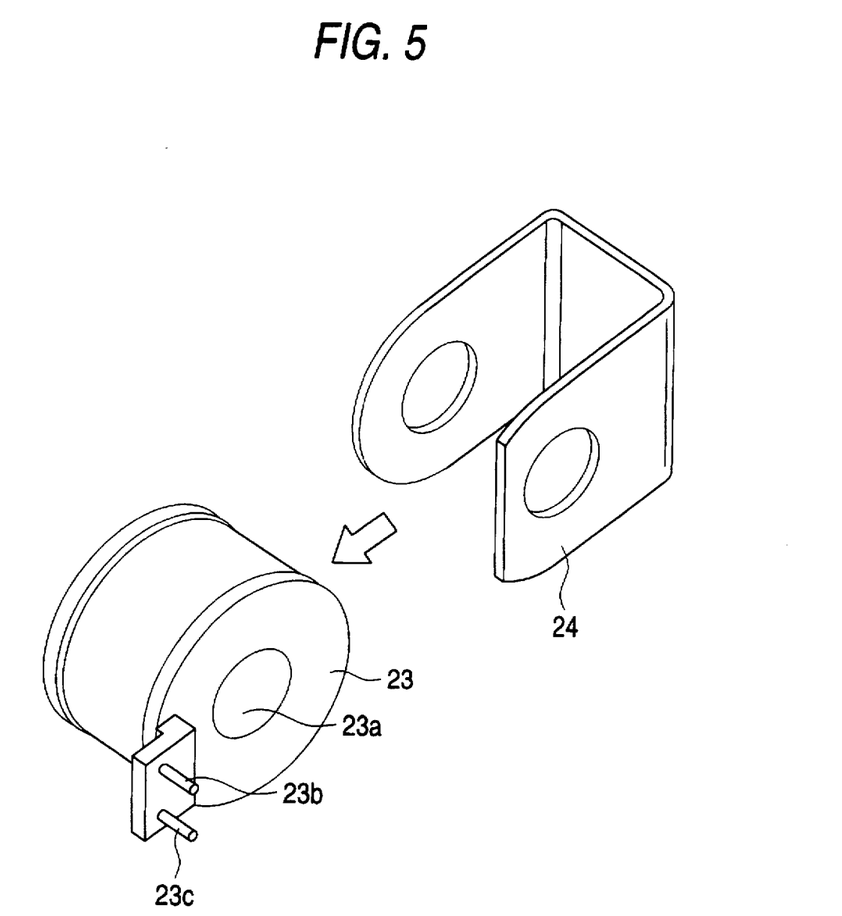
FIG. 5 is a perspective view showing the structure of an exciting coil portion of an electromagnetic valve and an outer yoke in the brake control module.
Figure 6A:
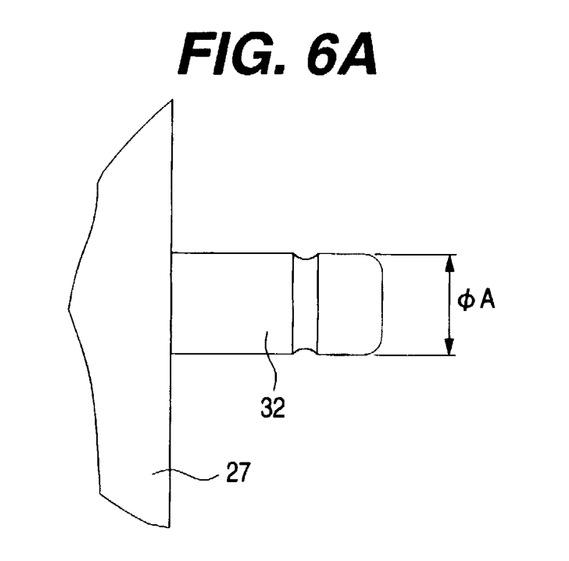
FIG. 6 is a explanatory diagram showing a relationship among the exciting coil portion of the electromagnetic valve and the outer yoke in the brake control module, and an electromagnetic valve mechanism.
Figure 6B:
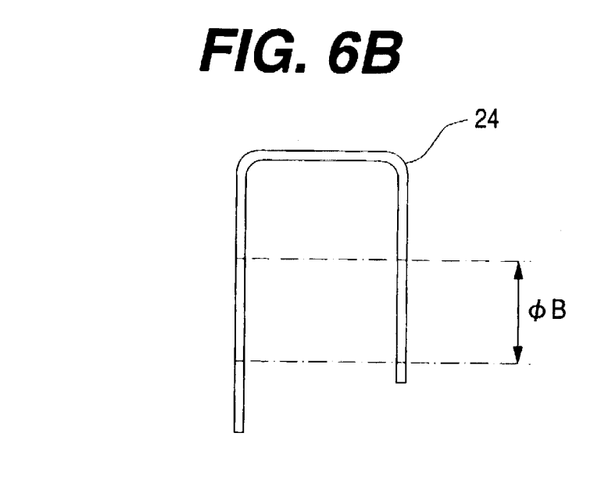
Figure 6C:
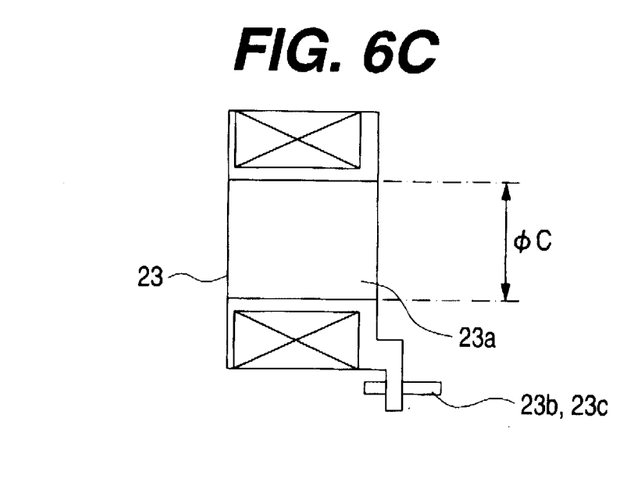
Figure 7:
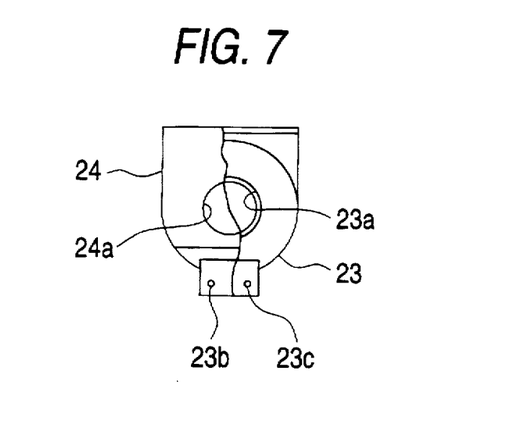
FIG. 7 is a perspective view taken along line C—C in FIG. 3.

FIGS. 1 to 7 show an embodiment of a brake control module 21 according to the present invention. Of these figures, FIG. 1 is a cross sectional view showing a brake control module 21 before any assembly has occured; FIG. 2 is a cross sectional view taken along line A—A in FIG. 1; FIG. 3 is a cross sectional view showing the brake control module 21 when the related component parts have been assembled thereinto; FIG. 4 is a cross sectional view taken along line B—B in FIG. 3, FIG. 5 is a perspective view showing the structure of an exciting coil portion 23 of an electromagnetic valve 22 and an outer yoke 24 in the brake control module 21; FIG. 6 is an explanatory diagram showing a relationship among the exciting coil portion 23 of the electromagnetic valve 22, the outer yoke 24 and an electromagnetic valve mechanism 32, and FIG. 7 is a perspective view taken on line C—C in FIG. 3.

The brake control module 21 of this embodiment is used for an antilock brake system and traction control system. The module 21 comprises an oil path block 27 which provides an operating oil path for communicatively connecting the brake master cylinder to the wheel brake cylinders, a plural number of electromagnetic valves 22 for controlling an oil pressure acting on the brake cylinder by opening and closing the operating oil path in the oil path block 27, and a control board 29 having a printed circuit board 28 on which a control circuit (CPU and the like) for controlling the operation of the electromagnetic valves 22 is mounted.

Each of the electromagnetic valves 22 is formed of two separate components, an exciting portion 31 and an electromagnetic valve mechanism 32. The exciting portion 31 includes an exciting coil portion 23 and an outer yoke 24 covering the exciting coil portion 23. The electromagnetic valve mechanism 32 is fit to the exciting portion 31. The electromagnetic valve mechanism 32 are assembled in advance into predetermined locations of the oil path block 27, thereby providing a mechanism assembly 34. The exciting portions 31 are mounted on the printed circuit board 28, thereby providing an electric part assembly 35.

The electric part assembly 35 is applied to the mechanism assembly 34 in the direction of an arrow (a) in FIGS. 1 and 2. Then, the electromagnetic valve mechanisms 32 of the mechanism assembly 34 are respectively fit to the exciting portions 31 of the electric part assembly 35, so that the electromagnetic valves 22 are completed.

To be more specific, as shown in FIGS. 5 and 6, the inner diameter C of a hole 23a of each exciting coil portion 23 to which the electromagnetic valve mechanism 32 is fit is selected to be large enough to allow a dimensional tolerance among the respective electromagnetic valve mechanisms 32 assembled into the oil path block 27.

The exciting coil portion 23 is fixed to the printed circuit board 28 in a manner that the feed terminals 23b and 23c of the exciting coil portion 23 are inserted into and soldered to the through-holes of the printed circuit board 28.

In the outer yoke 24, the diameter B of a mechanism insertion hole 24a thereof is selected to be small so as to minimize a gap between the mechanism insertion hole 24a and the electromagnetic valve mechanism 32 to be inserted into the hole 24a. And the outer yoke 24 is mounted on the exciting coil portion 23 slidably in the radial direction of the electromagnetic valve mechanism 32. In coupling the mechanism assembly 34 with the electric part assembly 35, the outer yoke 24 is slid on the exciting coil portion 23, so that the electromagnetic valve mechanism 32 of the mechanism assembly 34 and the outer yoke 24 of the electric part assembly 35 are adjustably positioned.

If the outer diameter of the electromagnetic valve mechanism 32 to be fit to the outer yoke 24 and the exciting coil portion 23 is A, the hole diameter B is slightly larger than (substantially equal to) the outside diameter A. The hole diameter C is much larger than the outer diameter A.

In the brake control module 21 thus constructed, the exciting portions 31 of the electromagnetic valves 22 which must be electrically connected are directly connected to the control circuit by inserting the related portions thereof into the through-holes of the printed circuit board 28 and soldering them, without using the wire harness as a separate connection. It is noted that the exciting portions 31 are electrically and mechanically connected to the printed circuit board 28.

By merely coupling the mechanism assembly 34 having the electromagnetic valve mechanism 32 assembled thereinto with the electric part assembly 35, the electromagnetic valve mechanisms 32 of the mechanism assembly 34 are respectively fit to the corresponding exciting portions 31 of the electric part assembly 35. The assembling of the plural number of electromagnetic valves 22 is completed at a stroke. When compared to the conventional brake control module where the electromagnetic valves are assembled one by one and the wire harness is used for the electrical connection, the present invention reduces the number of assembling steps and the number of required component parts, reduces the cost to manufacture, and eases the assembly work.

The inner diameter C of the hole of each exciting coil portion 23 to which the electromagnetic valve mechanism 32 is fit is selected to be large enough to allow a dimensional tolerance among the respective electromagnetic valve mechanisms 32 assembled into the oil path block 27. The exciting coil portion 23 is fixed to the printed circuit board 28. The diameter B of the mechanism insertion hole 24a of the outer yoke 24 is selected to be small so as to minimize a gap between the mechanism insertion hole 24a and the electromagnetic valve mechanism 32 to be inserted into the hole 24a, and the outer yoke 24 is mounted on the exciting coil portion 23 slidably in the radial direction of the electromagnetic valve mechanism 32. In coupling the mechanism assembly 34 with the electric part assembly 35, the outer yoke 24 is slid on the exciting coil portion 23, so that the electromagnetic valve mechanism 32 of the mechanism assembly 34 and the outer yoke 24 of the electric part assembly 35 are adjustably positioned.

Therefore, the plural number of the electromagnetic valves 22 may be assembled at a stroke. The gap between the outer yoke 24 and the electromagnetic valve mechanism 32 may be kept at a minimum value. As a result, no increase of magnetic resistance is caused from the gap present in the magnetic path and the electromagnetic valves 22 assembled have high performance.

The quantity of the deviation S between the electromagnetic valve mechanism 32 of each electromagnetic valve 22 and the exciting coil portion 23 varies for each electromagnetic valve 22 because dimensional tolerance, assembling errors, and the like are present. However, the electromagnetic valve mechanisms 32 are fit into the outer yokes 24 without any deviation. This is illustrated in FIG. 4.

What is claimed is:

1. A brake control module comprising;

a mechanism assembly including a plurality of electromagnetic valve mechanisms including electromagnetic valves and an oil path block which provides an operating oil path for communicatively connecting a brake master cylinder to a wheel brake cylinder, said electromagnetic valves controlling the oil pressure by opening and closing said operating oil path in said oil path block; and an electric part assembly including a plurality of exciting coil portions respectively having a hole, a control board having a printed circuit board on which a control circuit for controlling the operation of said electromagnetic valves is mounted, and an outer yoke respectively mounted on said each exciting coil portion slidably in a radius direction of said hole of said each exciting coil portion and having a mechanism insertion hole into which said electromagnetic valve mechanism is inserted, said electric part being coupled to said mechanism assembly;

wherein said electromagnetic valve mechanisms fit to said holes of said exciting coil portions and said mechanism insertion holes of said outer yokes so as to complete said electromagnetic valves which control an oil pressure acting on said brake cylinder, and said outer yokes are respectively slid so as to accommodate a dimensional difference.

2. The brake control module according to claim 1, wherein a clearance between the electromagnetic valves and the mechanism insertion holes is larger than a clearance between the electromagnetic valves and the holes of the exciting coil portion.

* * * * *